United States Patent [19]

Isono

[11] Patent Number: 5,363,433
[45] Date of Patent: Nov. 8, 1994

[54] INFORMATION ACQUISITION SYSTEM

[75] Inventor: Osamu Isono, Kawasaki, Japan

[73] Assignee: Fujitsu Limited, Kanagawa, Japan

[21] Appl. No.: 874,975

[22] Filed: Apr. 27, 1992

[30] Foreign Application Priority Data

May 8, 1991 [JP] Japan .................................. 3-102384

[51] Int. Cl.$^5$ ...................... H04M 11/00; H04N 7/00; H04Q 11/04; H04J 3/24
[52] U.S. Cl. ........................................... 379/92; 348/1; 370/60; 370/94.1; 370/110.1; 455/2
[58] Field of Search ........................ 379/92, 93, 96–98; 358/84; 455/2, 3.1, 5.1; 370/54, 95.1, 60, 95.2, 94.1, 94.2, 60.1, 85.8, 110.1

[56] References Cited

U.S. PATENT DOCUMENTS 3,969,594  7/1976  DeLuca et al. .................... 379/92
4,792,968  12/1988  Katz ..................................... 379/92
5,084,867  9/1990  Tachibana et al. ................. 370/54
5,157,654  12/1990  Cisneros ............................ 370/94.1

Primary Examiner—John K. Peng
Assistant Examiner—Daniel J. Wu

[57] ABSTRACT

An information acquisition system for acquiring information which includes responses in answer to questions which participants have been asked by a radio or television broadcast program includes terminal equipment for inputting a response from a participant, an ATM network for transmitting, to a broadcasting station, information which includes the response inputted from the terminal equipment, network terminating equipment provided in the broadcasting station and connected to a predetermined ATM exchange in the ATM network, and an information acquisition unit, which is connected to the network terminating equipment, for receiving, collecting and totalizing the information, which includes the response inputted from the terminal equipment, via the ATM network and the network terminating equipment.

10 Claims, 15 Drawing Sheets

| # | 「0」 | 「1」 |
|---|---|---|
| 1 | YES | NO |
| 2 | MALE | FEMALE |
| 3 | TOKYO | OSAKA |

| # 1 * 0 |
| # 2 * 1 |
| # 3 * 0 |

INFORMATION ACQUISITION SYSTEM

BACKGROUND OF THE INVENTION

This invention relates to an information acquisition system and, more particularly, to an information acquisition system wherein response data in answer to a question which participants have been asked by a radio or television broadcast program is acquired at the broadcasting station.

Radio and television broadcasts include audience-participation shows in which public-opinion surveys, popularity polls, various questionnaires and the solicitation of quiz answers are carried out by telephone with the expectation of a high level of enthusiasm for participation by the audience. In order to realize audience-participation shows of this kind, an information acquisition system is required in which the response data from the audience is gathered and analyzed on the side of the broadcasting station.

FIG. 16 is a block diagram illustrating the construction of an information acquisition system according to the prior art. As shown in FIG. 16, the system includes participant telephones $1_1, 1_2, \ldots, 1_n$, a telephone network 2, a terminating central telephone exchange 3 in the telephone network, and a broadcasting station 4 for television or the like. The broadcasting station 4 includes a private branch exchange (PBX) 5, which is the subscriber's terminating equipment, a data totalizing unit 6 for totalizing responses, and a broadcasting unit 7. Telephone lines $8_1, 8_2, \ldots, 8_n$ interconnect the terminating local telephone exchange 3 and the PBX 5. The solid lines $L_1, L_2, \ldots, L_n$ represent line connections to the participants. These connections comprise physical circuits.

When participants are asked a question by an audience-participation show on television, for example, the participants use their own telephones to call the broadcasting station and answer "YES" or "NO", etc., to the question. The responses from the telephones $1_1 \sim 1_n$ of the participants arrive at the terminating local telephone exchange 3 via the telephone network 2. These responses are then connected to the PBX 5 at the broadcasting station 4 through the plurality of lines $8_1, 8_2, \ldots, 8_n$, and from the PBX 5 to the data totalizing unit 6. The data totalizing unit 6 totals and analyzes the responses from the participants. The results of analysis are broadcast via the broadcasting unit 7 so that participants can be informed of these results.

FIG. 17 is a block diagram showing a specific example of the arrangement of components within the broadcasting station in the conventional information acquisition system. Portions identical with those shown in FIG. 16 are designated by like reference numerals. As shown in FIG. 17, the PBX 5 includes a switch (SW) 5a, signal equipment 5b, a central processing unit (CPU) 5c, and a bus 5d. The data totalizing unit 6 includes data receiving circuits $6a_1 \sim 6a_m$, a central processing unit (CPU) 6b, a main memory (MM) 6c, a memory device 6d such as a hard disk for storing response data, and a bus 6e.

Each line from the terminating local telephone exchange 3 is connected to the switch 5a in the PBX 5 and to the signal equipment 5b, which sends and receives various signals. The switch 5a and the signal equipment 5b, which are connected to the CPU 5c via the bus 5d, perform line connecting and disconnecting processing and send and receive various signals under the control of the CPU 5c. For example, when a participant uses a telephone to call the broadcasting station, the call signal arrives at the terminating local telephone exchange 3 via the telephone network 2, and the terminating local telephone exchange 3 reverses the polarity of one idle line (assumed here to be line $8_1$). The signal equipment 5 senses the reversal in polarity and notifies the CPU 5c. The latter causes the signal equipment 5b to send an answer signal back to the terminating local telephone exchange 3 and controls the switch 5a to connect the line $8_1$ with a predetermined data receiving circuit that is capable of data reception. By virtue of the foregoing operation, a channel is formed between the telephone and the broadcasting station so that the response data is capable of being received from the telephone.

The lines from the participants that have been connected via the switch 5a are connected to respective ones of the data receiving circuits $6a_1 \sim 6a_m$, which proceed to receive the responses from the participants. The CPU 6b reads, via the bus 6e, the results of response reception in the data receiving circuits $6a_1 \sim 6a_m$ and, by way of example, calculates the total number of responses, the total number "YES" responses and the total number of "NO" responses. The CPU 6b then stores the results of totalization in the memory device 6d. The results, stored in the memory device 6d, of totalizing the responses from the participants are broadcast appropriately via the broadcasting unit 7. It should be noted that programs necessary for operations such as the totalizing operation performed by the CPU 6b are stored in the main memory 6c.

FIG. 18 is a block diagram illustrating the construction of a data receiving circuit according to the prior art. The data receiving circuit includes a signal transceiver circuit 6a-1, an MF code-data analyzing circuit 6a-2 for receiving and analyzing response data comprising a multi-frequency code, a microprocessor ($\mu$P) 6a-3, a main memory (MM) 6a-4, and a bus 6a-5. The MF code-data analyzing circuit 6a-2 analyzes a participant's response, which is in the form of an MF code of a push-button telephone or the like sent via an analog line. More specifically, if a participant's response to a question is "YES", the participant uses his telephone to enter "#0*". If the participant's response is "NO" then the participant presses the keys for "#1*". It should be noted that the symbols "#", "*" are for demarcation purposes, wherein "#" indicates the start of a numeral and "*" the end of a numeral. The numerals "0", "1" indicate "YES" and "NO", respectively. Since the telephone network 2 is adapted so as to sequentially transmit the frequency codes corresponding to the keys pressed, the MF code-data analyzing circuit 6a-2 analyzes the received multi-frequency code data and determines whether a response is "YES" or "NO". The results of analysis are stored in the form of a digital signal in the main memory 6a-4 via the bus 6a-5. The stored information is read into the CPU 6b via the bus 6e, and the CPU 6b totalizes the information and sends the totalized results to the broadcasting unit 7. Though the signal transceiver circuit 6a-1 is not always required, it is adapted to receive signals other than the response data sent from the line side, and to transmit predetermined signals, in a case where highly sophisticated response-data acquisition is carried out. The microprocessor 6a-3 controls the operation of the signal transceiver circuit 6a-1, MF code-data analyzing circuit 6a-2 and main memory 6a-4 via the bus 6a-5.

In an analog telephone network, the number of telephone lines that can be installed between the broadcasting station 4 and the terminating local telephone exchange 3 is physically limited. For example, several score to a hundred of such lines may be provided. Consequently, in the conventional information acquisition system, undesirable phenomena occur, such as lines being found busy, when a large number of participants take part in the program. Though it is believed that several thousand to several tens of thousands of participants are needed in order to have a successful audience-participation show, the state of the art in conventional information acquisition systems is such that the aforementioned phenomena, e.g., busy lines, occur owing to the physical limitation upon the number of lines. Thus, a practical problem which arises is that, in actuality, there is a limit upon the number of participants that are capable of taking part in audience-participation shows.

Further, in cases where participation in a radio or television program is allowed freely throughout the country, a terminating congestion can occur on a nationwide scale in the local telephone exchange which accommodates the broadcasting station, and this can put considerable pressure on the normal connecting function of the telephone network. As a consequence, it is necessary to place a limit upon the regions from which participants can take part or to limit telephone numbers, such as by limiting telephone numbers to those whose last digit is 0. Thus, a problem which arises is that all members of the audience wishing to participate cannot do so freely.

SUMMARY OF THE INVENTION

Accordingly, a first object of the present invention is to provide an information acquisition system in which it is possible to increase the number of participants that are capable of taking part in audience-participation shows offered by broadcasting stations.

Another object of the present invention is to provide an information acquisition system in which phenomena such as busy lines will not occur even if the number of participants in a program is increased.

Still another object of the present invention is to provide an information acquisition system in which the occurrence of terminating congestion can be prevented in a central telephone exchange which accommodates a broadcasting station, even if the number of participants in a program is increased.

A further object of the present invention is to provide an information acquisition system that is capable of analyzing and totalizing responses, inclusive of the attributes (telephone numbers, gender, places of residence) of participants answering questions.

According to the present invention, the foregoing objects are attained by providing an information acquisition system comprising terminal equipment for inputting a response from a participant, an ATM network for transmitting, to a broadcasting station, information which includes the response inputted from the terminal equipment, network terminating equipment provided in the broadcasting station and connected to a predetermined ATM exchange, and an information acquisition unit, which is connected to the network terminating equipment equipment, for receiving and collecting the information which includes the response inputted from the terminal equipment.

In accordance with the information acquisition system according to the invention, the terminal equipment and the broadcasting station are connected by an ultra-high-speed ATM network, and therefore a multiplicity of logical links are established on a single physical line so that response data from a large number of participants can be transmitted in multiplexed fashion. As a result, it can be so arranged that busy lines and other such phenomena will not occur even if there are few lines between the broadcasting station and the terminating exchange, and even if the number of participants in a program is increased. Moreover, the occurrence of terminating congestion in the terminating exchange can be eliminated.

The ATM network is designed to automatically transfer the originating number of the terminal equipment and the attributes of the terminal equipment on a call-by-call basis prior to transfer of the response data. Moreover, the ATM network is adapted to transfer the response data upon first attaching a virtual channel identifier (VCI) for call identification. As a result, response analysis that takes the attributes of the respondent into consideration can be performed on the side of the broadcasting station merely by inputting the response data from the terminal equipment.

Further, in accordance with the information acquisition system of the invention, the terminal equipment and the broadcasting station are connected by the ultra-high-speed ATM network, as mentioned above. As a result, even if response data in answer to a plurality of questions as well as attribute data relating to the gender and places of residence, etc., of the respondents is entered, this data can be transmitted in a short period of time without the occurrence of phenomena such as busy lines and terminating congestion. This makes possible multiple questioning by a television or radio program as well as response analysis that takes the gender and places of residence of the respondents into consideration.

Other features and advantages of the present invention will be apparent from the following description taken in congestion with the accompanying drawings, in which like reference characters designate the same or similar parts throughout the figures thereof.

BRIEF DESCRIPTION OF THE DRAWINGS

FIGS. 9(A)–9(C) are explanatory views for describing the input of response data, in which FIG. 9(A) is an example of a monitor display, FIG. 9(B) an example of a data input, and FIG. 9(C) a view for describing a cell;

FIGS. 13(A)–13(D) show examples of data stored in a reception memory, in which FIG. 13(A) is an example in which response data is stored in simple fashion every VCI, FIG. 13(B) is an example in which response data is stored every VCI upon being classified by question, FIG. 13(C) is an example in which response data is stored in storage areas that differ every VCI with regard to a plurality of questions, and FIG. 13(D) is an example in which originating numbers and response data are stored every VCI;

DESCRIPTION OF THE PREFERRED EMBODIMENT (a) Theoretical arrangement of the invention As shown in FIG. 1, the information acquisition system of the present invention includes terminal equipment 11, provided on the side of a participant, for entering a response to a question from an audience-participation show, a broadcasting station 12 which provides a television or radio broadcast, and an ATM network which transfers data cells in an asynchronous transfer mode (hereinafter referred to simply as "ATM"). The ATM network 13 is provided with an exchange 14a, which is an originating exchange with regard to the terminal equipment 11, and an exchange 14b, which is a terminating exchange with regard to the broadcasting station 12. The terminating exchange 14b and the broadcasting station 12 are connected by a single ATM circuit 14c, which is capable of high-speed data transmission.

Figure 1:
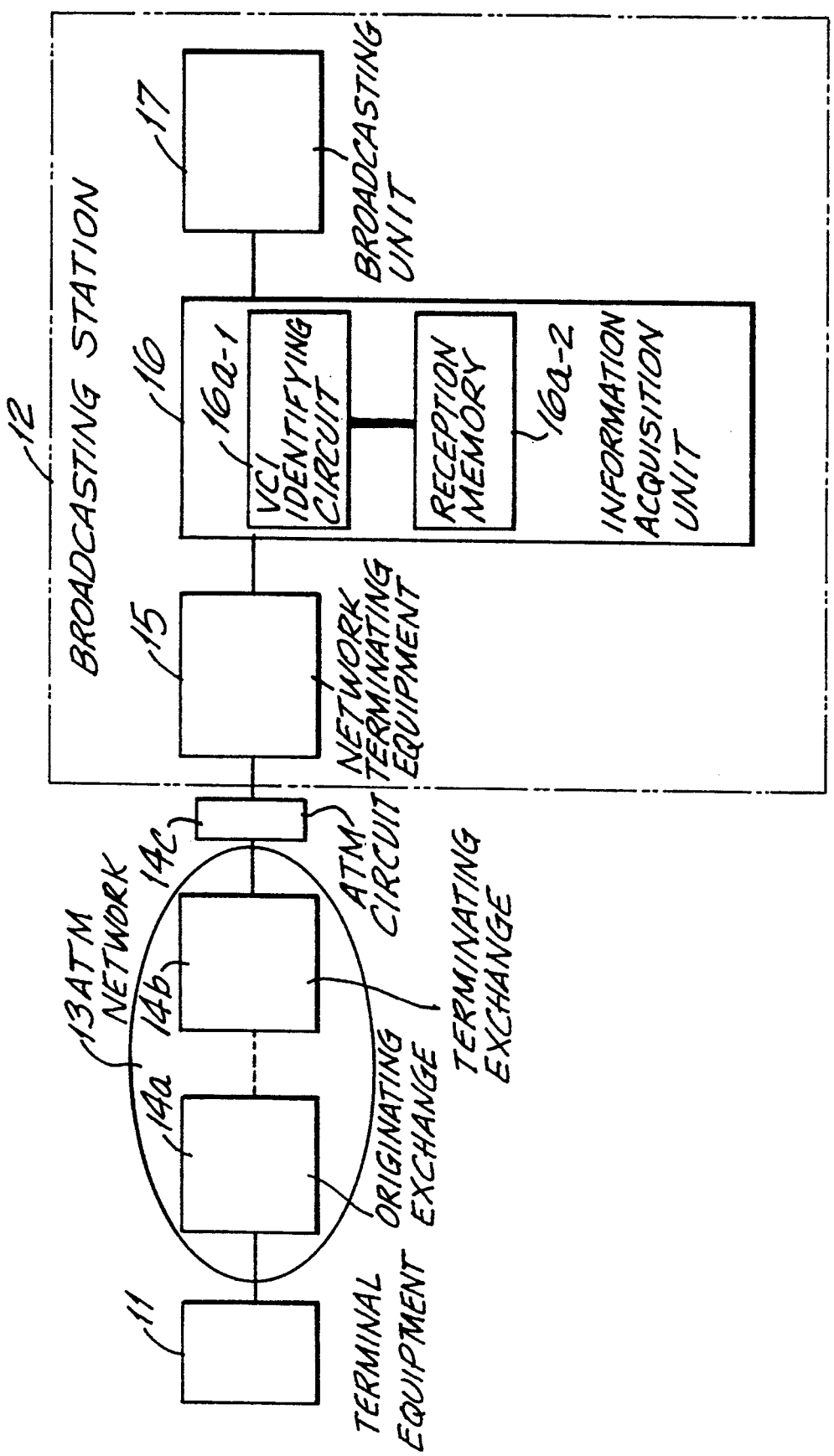
FIG. 1 is a block diagram showing the theoretical arrangement of the present invention.

The broadcasting station 12 includes network terminating equipment 15, an information acquisition unit 16 for collecting and totalizing response data contained in data cells, and a broadcasting unit 17. The information acquisition unit 16 has a VCI identifying circuit 16a-1 for identifying a virtual channel identifier (VCI), which has been added to an inputted data cell, and outputting response data every VCI, and a reception memory 16a-2 for storing response data every VCI.

When a participant is asked a question by an audience-participation show on television, for example, the participant use his/her own terminal equipment 11 to call the broadcasting station. As a result of this operation, the ATM network 13 performs call control, described later, to decide a path between the originating exchange 14a and the terminating exchange 14b, and to assign separate VCIs for call identification to the terminal equipment 11 and broadcasting station 12. Thereafter, the terminal equipment forms a data cell by appending the assigned VCI to "YES" OR "NO" response data entered in reply to the question, and sends this data cell to the ATM network 13. When the data cell arrives at the terminating exchange 14b, the latter converts the VCI of this data cell into the VCI for the broadcasting station and then sends this data cell to the network terminating equipment 15 of the broadcasting station 12. The network terminating equipment 15 of the broadcasting station 12 inputs the data cell to the information acquisition unit 16, in which the VCI identifying circuit 16a-1 identifies the VCI appended to the inputted data cell and stores the response data in the reception memory 16a-2 every VCI. The information acquisition unit 16 identifies and totalizes the response data and notifies the broadcasting unit 17 of the results of totalization.

In accordance with the ATM network 13, a call can be identified owing to the fact that the terminal equipment 11 and broadcasting station 12 mutually possess VCIs. Consequently, by assigning different VCIs every call, a multiplicity of logical links can be established on a path, thereby making it possible to realize high-speed multiplexed communication. This means that busy lines and terminating congestion can be eliminated even if the terminating exchange 14b and broadcasting station 12 are connected by a single ATM line.

(b) ATM system

There is ever increasing need for multimedia communication which includes not only voice and data communication but also communication by motion picture. B-ISDN (broadband-ISDN) exchange techniques, which are based upon the above-mentioned ATM, have been agreed upon by the CCITT as means for realizing the broadband communication involved in multimedia communication, and research regarding these techniques is proceeding.

According to time-shared multiplexing in current methods of digital exchange, multiplexed transmission is achieved by dividing a time axis into time slots of prescribed time intervals, allocating N-channel data to each time slot and establishing synchronism among the N channels. In an ATM system, on the other hand, logical links are established in multiplexed fashion on a physical line, whereby the line is allocated to a plurality of calls. Image data or audio data from the terminal corresponding to each call is broken down into information units (referred to as "cells") of a fixed length, and the cells are sequentially sent out on the line to achieve multiplexing. With the ATM system, even cells having the same destination are sent out on the line asynchronously. The breaks between cells are identified on the basis of a header that has been written in each cell.

Figure 2:
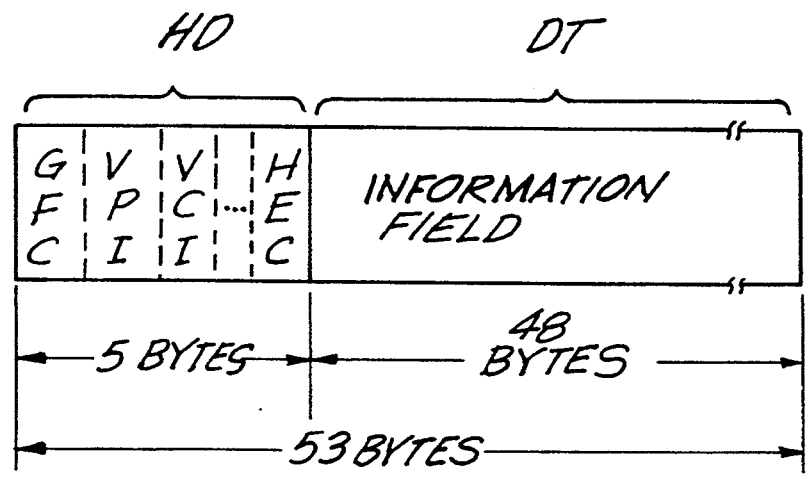
FIG. 2 is a diagram showing the constitution of an ATM cell.

As illustrated in FIG. 2, a cell is composed of a block having a fixed length of 53 bytes. Five bytes within the block define a header HD, and the remaining 48 bytes constitute an information field DT. The header HD contains a virtual channel identifier (VCI), for the purpose of call identification, so that the destination will be understood even after the data has been broken down into blocks, as well as a virtual path identifier (VPI) generated by gathering several VCIs together, a generic flow control (GFC) used in flow control between links, and a header error control (HEC).

Figure 3:
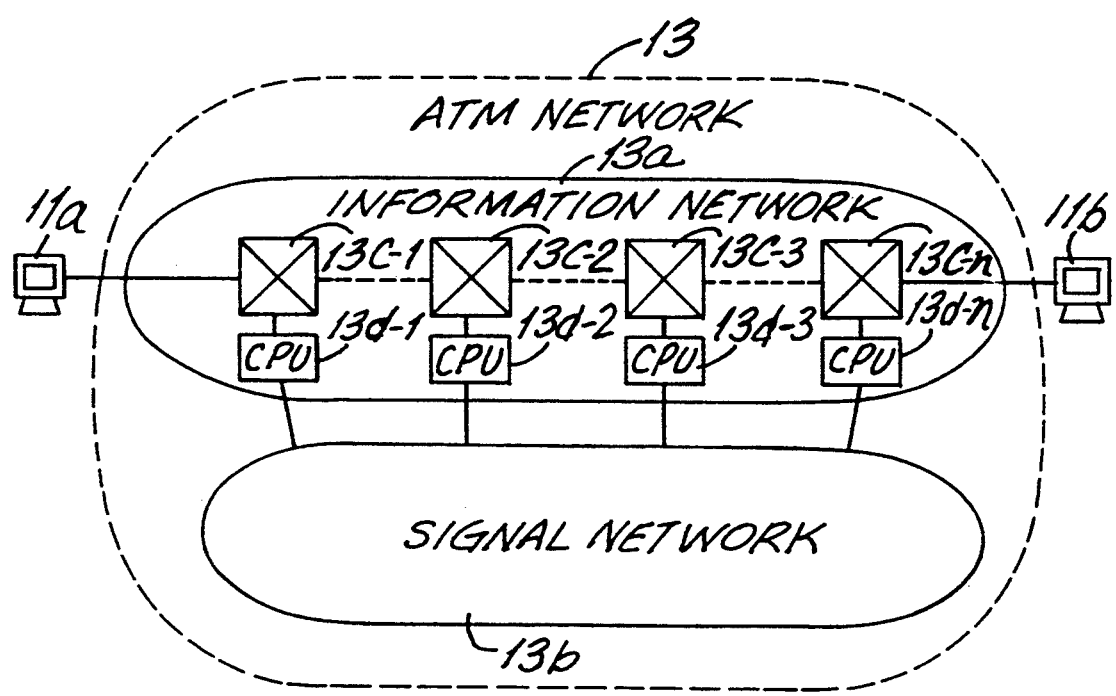
FIG. 3 is a schematic view illustrating the general arrangement of an ATM network and is for describing an ATM system.

FIG. 3 is a schematic view illustrating the general arrangement of an ATM network and is for describing an ATM system. Numerals 11a, 11b denote terminal equipment, and numeral 13 designates an ATM network. The ATM network 13 has an information network 13a which transmits data cells, and a signal network 13b which transmits control signals. CPUs 13d-1 through 13d-m of respective ATM exchanges 13c-1 through 13c-n in the information network 13a are connected to the signal network 13b.

When the originating terminal 11a performs a call operation for calling the terminating terminal 11b, the ATM exchange (the exchange on the originating side) 13c-1 senses the call and sends the signal network 13b connection information which includes the originating number (telephone number), the terminating number and other data. As a result, the signal network 13b performs call control to decide the down path from the exchange 13c-1 on the originating side to the ATM exchange (the exchange on the terminating side) 13c-n to which the terminating terminal equipment has been connected, and to decide the repeating ATM exchanges 13c-2, 13c-3, . . . . When each ATM exchange becomes a repeater station of a call, it decides its own VCI with respect to the call and sends this VCI to the signal network 13b. The signal network 13b transmits the VCI of this ATM exchange together with the originating number and terminating number and notifies the lower-ranking repeating ATM exchange.

When the exchange 13c-n on the terminating side receives the connection information containing the originating number, terminating number and the VCI of the higher-ranking ATM exchange, it assigns a predetermined VCI to the terminating terminal 11 and determines whether the terminating terminal 11 is capable of communication. If the terminal 11 is capable of communicating, then, while deciding the up path, the signal network 13b notifies the exchange 13c-1 on the originating side of the fact that communication is possible, and the exchange on the originating side assigns a predetermined VCI to the originating terminal 11a, in the same manner as was done in the case of the down path.

Each of the ATM exchanges 13c-1 through 13c-n on the path registers the following, for each of the up and down paths, in an internal routing table in correlation with the VCI of the higher-ranking ATM exchange: (1) connection information for specifying an output path (outgoing highway) of the cell having the VCI, and (2) a new VCI (its own VCI) added to the outputted cell.

When a path is formed between the originating terminal 11a and the terminating terminal 11b by the foregoing operation, both terminals send and receive the call cell and the answer cell in mutual fashion to verify the communication procedure. Thereafter, the originating terminal 11a produces a cell by breaking down the data to be sent into predetermined byte lengths and adding a header which contains the assigned VCI, and sends this cell to the ATM network 13. When each of the ATM exchanges 13c-1 through 13c-n receives, as an input, a cell from the higher-ranking exchange via a predetermined incoming highway, it replaces the VCI of the inputted cell based upon the routing table and sends this cell out on a predetermined outgoing highway. As a result, the cell outputted by the originating terminal 11 arrives at the exchange 13c-n on the terminating side via the path decided by call control. On the basis of the routing table, the exchange 13c-n on the terminating side replaces the VCI that has been appended to the inputted cell by the VCI that has been assigned to the terminating terminal. The exchange 13c-n then sends this cell to the line to which the terminating terminal 11b is connected.

Thereafter, the originating terminal 11a sends cells successively to the terminating terminal 11b, and the terminating terminal assembles the information field DT contained in received cells, thereby restoring the original data.

The foregoing relates to a case for dealing with one call. However, by changing the values of the VCIs possessed at both ends of each line between a terminal and the ATM exchange and between mutually adjacent ATM exchanges, logical links conforming to a large number of calls can be established on one line, as a result of which high-speed multiplexed communication is achieved. In accordance with an ATM system, items of information in an information source that have different transmission rates, such as images, data and audio, can be multiplexed, and therefore one transmission line can be used effectively. Moreover, re-transmission control and complicated communication procedures of the kind carried out by software using packet switching are unnecessary and it is possible to perform data transmission at ultra-high-speeds, such as 150 Mbps.

Further, an ATM exchange has a buffering function by which a call can be accepted and sent to a terminating terminal without making the originating terminal wait even if the terminating terminal experiences a large number of calls. For example, if the terminating terminal 11b is subjected to calls from a large number of terminals simultaneously and, as a result, there is no longer a vacancy in the line between the exchange 13c-n on the terminating side and the terminating terminal 11b, a cell not sent to the terminating terminal is generated. In such case, the exchange 13c-n on the terminating side buffers the cell not sent and transmits it when the line becomes idle, whereby the call can be accepted and sent to the terminating terminal without making the originating terminal wait. In case of short telephonic messages, such as the response data mentioned above, the high speed of the ATM system is such that a situation in which there is no vacancy in the line between the terminating exchange and the terminating terminal will not take place even if a considerable number of calls occur at the same time. However, even if the line should no longer have a vacancy owing to the simultaneous occurrence of an extremely large number of calls, the call from an originating terminal can still be accepted and a busy state avoided by virtue of the above-mentioned buffering function of the ATM exchange.

Figures 4, 5:
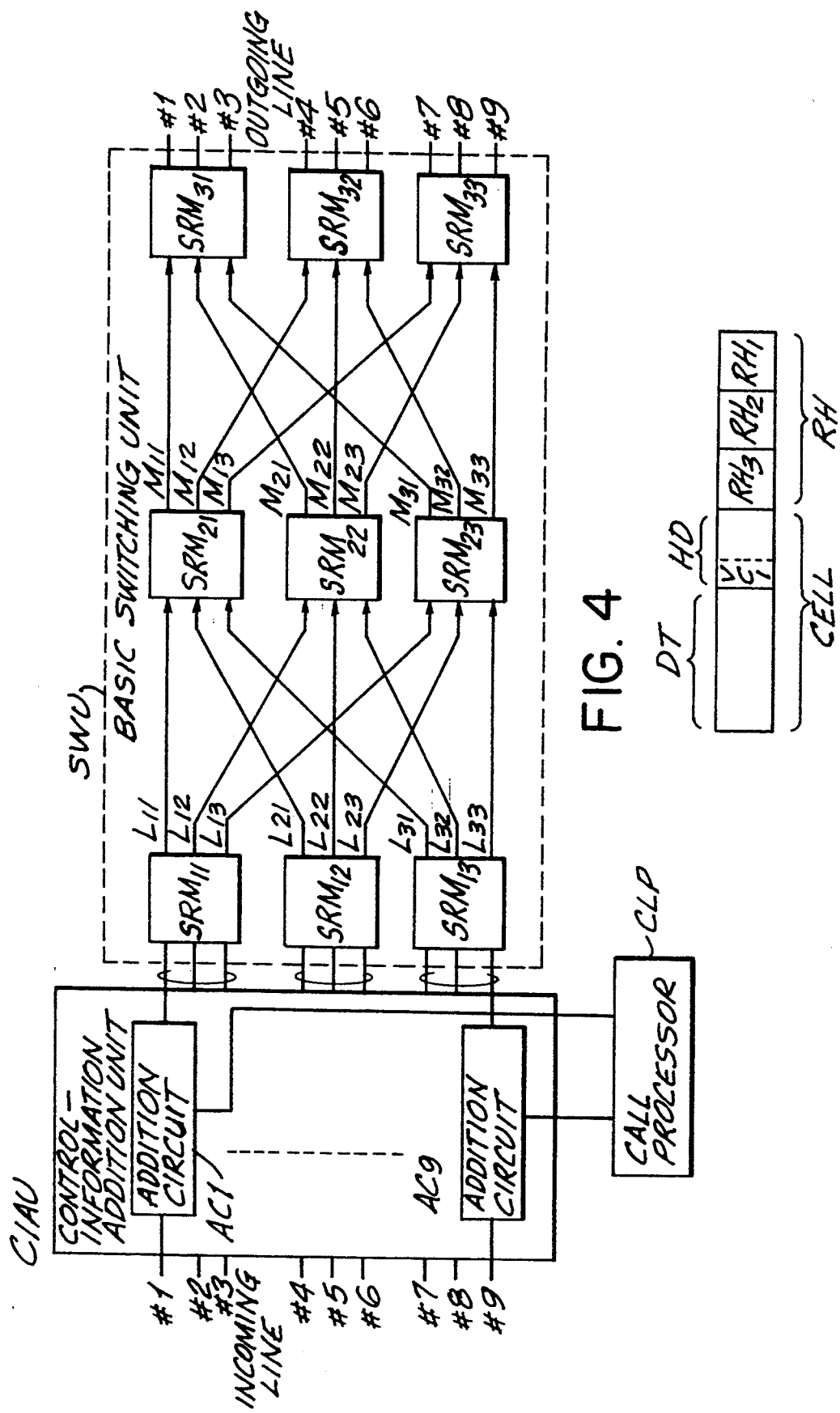
FIG. 4 is a block diagram showing a self-routing ATM exchange.
FIG. 5 is an example of a format of information outputted by an addition circuit.

FIG. 4 is a block diagram showing the construction of a self-routing ATM exchange and is for describing the buffering function of an ATM exchange. The ATM exchange has one basic switching unit SWU, a control-information addition unit CIAU, and a call processor (call controller) CLP.

The basic switching unit SWU, which is equipped with input-stage self-routing switch modules $SRM_{11} \sim SRM_{13}$, intermediate-stage self-routing switch modules $SRM_{21} \sim SRM_{23}$ and output-stage self-routing switch modules $SRM_{31} \sim SRM_{33}$, is of a multiple-link (three links in FIG. 4) configuration. The links are primary links $L_{11} \sim L_{33}$ and secondary links $M_{11} \sim M_{33}$. The input ends of the input-stage switch modules $SRM_{11} \sim SRM_{13}$ are connected to incoming lines (incoming highways) #1 ~ #9 via the control-information addition unit CIAU, and the output ends of these modules are connected the intermediate-stage switch modules $SRM_{21} \sim SRM_{23}$. The output ends of these intermediate-stage switch modules are connected to the output-stage switch modules $SRM_{31} \sim SRM_{33}$, and the output ends of these output-stage switch modules are connected to outgoing lines (outgoing highways) #1~#9.

The control-information addition unit CIAU has addition circuits AC1~AC9 for adding routing information to corresponding ones of the incoming lines #1~#9. The addition circuits AC1~AC9 add routing headers (described below) to the cells inputted from the corresponding incoming lines, replaces the VCIs contained in these cells and then sends the cells to the basic switching unit SWU.

At the time of a call, the call controller CLP carries out call control to decide the VCI of the call, decide the routing header conforming to the location of the terminating terminal, and writes these items of information (the routing header and the VCI) in a routing table (not shown) of the addition circuit to which the cell corresponding to the call is inputted. It should be noted that the addition circuit to which the call is inputted is already known from information communicated to the addition circuit from the higher-ranking ATM exchange at the time of call control. Further, the above-mentioned control information (the routing header and the VCI) that has been decided is written in the routing table in correlation with the VCI of the higher-ranking ATM exchange. The routing header, represented by RH, has three items of routing information $RH_1 \sim RH_3$. The item of routing information $RH_1$ indicates the number of the primary link, namely the output-end number of the input-stage module. The item of routing information $RH_2$ indicates the number of the secondary link, namely the output-end number of the intermediate-stage module, and the item of routing information $RH_3$ indicates the outgoing-line number, namely the output-end number of the output-stage module.

When call control ends and a cell is inputted by a prescribed incoming line via the higher-ranking ATM exchange, the addition circuit connected to this incoming line reads the control information (the routing header RH and the VCI), which conforms to the VCI that has been added to the input cell, out of the routing table. Further, the addition circuit adds the routing header to the cell, replaces the VCI of this cell by the VCI that has been read, and then sends the cell to the basic switching unit SWU. FIG. 5 shows an example of the format of information outputted by each of the addition circuits AC1~AC9.

A module $SRM_{ij}$ representative of each stage uses the routing header to introduce the cell to the particular link, namely to the prescribed output end, and to eventually transmit the cell from the prescribed outgoing line. It should be noted that the routing header is removed by a post-processing circuit (not shown) before the cell is sent to the outgoing line.

Figure 6:
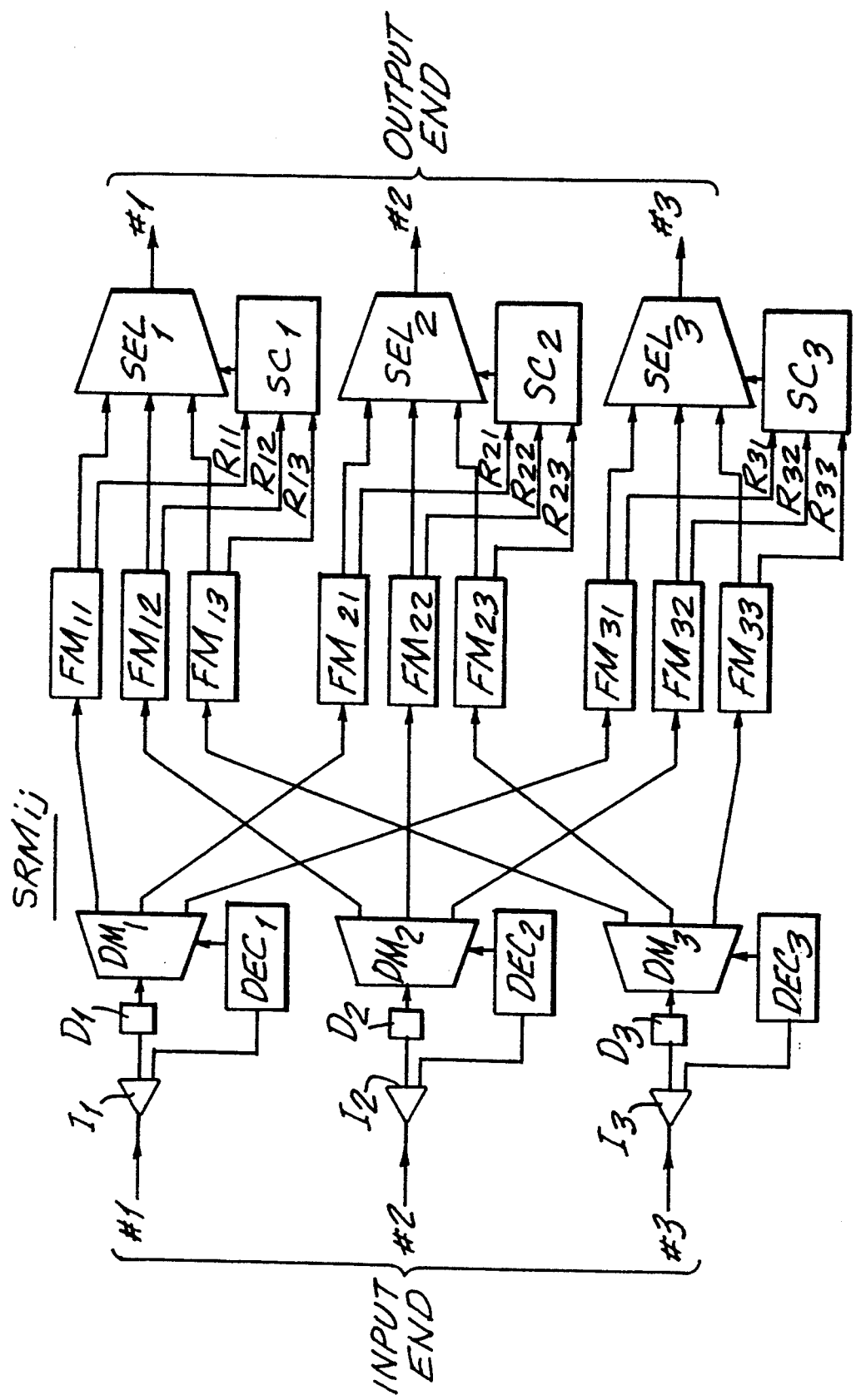
FIG. 6 is a circuit diagram showing a self-routing switch module.

FIG. 6 is a circuit diagram showing a specific example of a self-routing switch module (SRM). The SRM includes control-information detecting circuits $I_1 \sim I_3$, transmission-information delay circuits $D_1 \sim D_3$, demultiplexers $DM_1 \sim DM_3$, control-information decoder circuits $DEC_1 \sim DEC_3$, buffer memories $FM_{11} \sim FM_{33}$, such as FIFO (first-in first-out) memories, selectors $SEL_1 \sim SEL_3$, and selector control circuits $SC_1 \sim SC_3$ for controlling the selectors $SEL_1 \sim SEL_3$ upon receiving request signals $R_{11} \sim R_{33}$ from the FIFO memories.

Transmission information which enters input ends #1~#3 has the format shown in FIG. 5. The detecting circuit $I_i$ (i=1~3) extracts the control information contained in this signal and sends the control information to the respective decoder circuit $DEC_i$. Since the control information has the input-stage routing header RH1, the intermediate-stage routing header RH2 and the output-stage routing header RH3, the detecting circuit $I_i$ detects the routing information RH1~RH3 depending upon what the number of the self-routing switch module SRM is. If the inputted routing information is indicative of output end #j (j=1~3), then the decoder circuit $DEC_i$ operates the demultiplexer $DM_i$ to send the transmission information to the FIFO memory $FM_{ji}$. For example, if the routing information contained in the information inputted from input end #1 indicates output end #2, then the decoder circuit $DEC_1$ controls the demultiplexer $DM_1$ to input the information from the input end #1 to the FIFO memory $FM_{21}$.

When the transmission information enters the FIFO memories $FM_{j1} \sim FM_{j3}$, the selector control circuit $S_j$ operates the selector $SEL_j$ to deliver the transmission information to the output end #j. The selector control circuit $SC_j$ constantly scans for a request signal $R_{ji}$ from the FIFO memory $FM_{ji}$, by way of example. When the request signal $R_{ji}$ is detected, the selector control circuit $SC_j$ operates so as to output the contents of the FIFO memory $FM_{ji}$ through the selector $SEL_j$. Alternatively, a request signal $R_{ji}$ enters the selector control circuit $SC_j$ as an interrupt signal and, when an interrupt occurs, the selector control circuit $SC_j$ outputs the contents of the FIFO memory $FM_{ji}$ through the selector $SEL_j$.

By providing each FIFO memory $FM_{ij}$ with a capacity equivalent to a plurality of cells, a buffering function is obtained so that it is possible to deal adequately with a case in which the quantity of transmission data becomes temporarily large.

(c) Embodiment of the information acquisition system according to the invention

Figure 7:
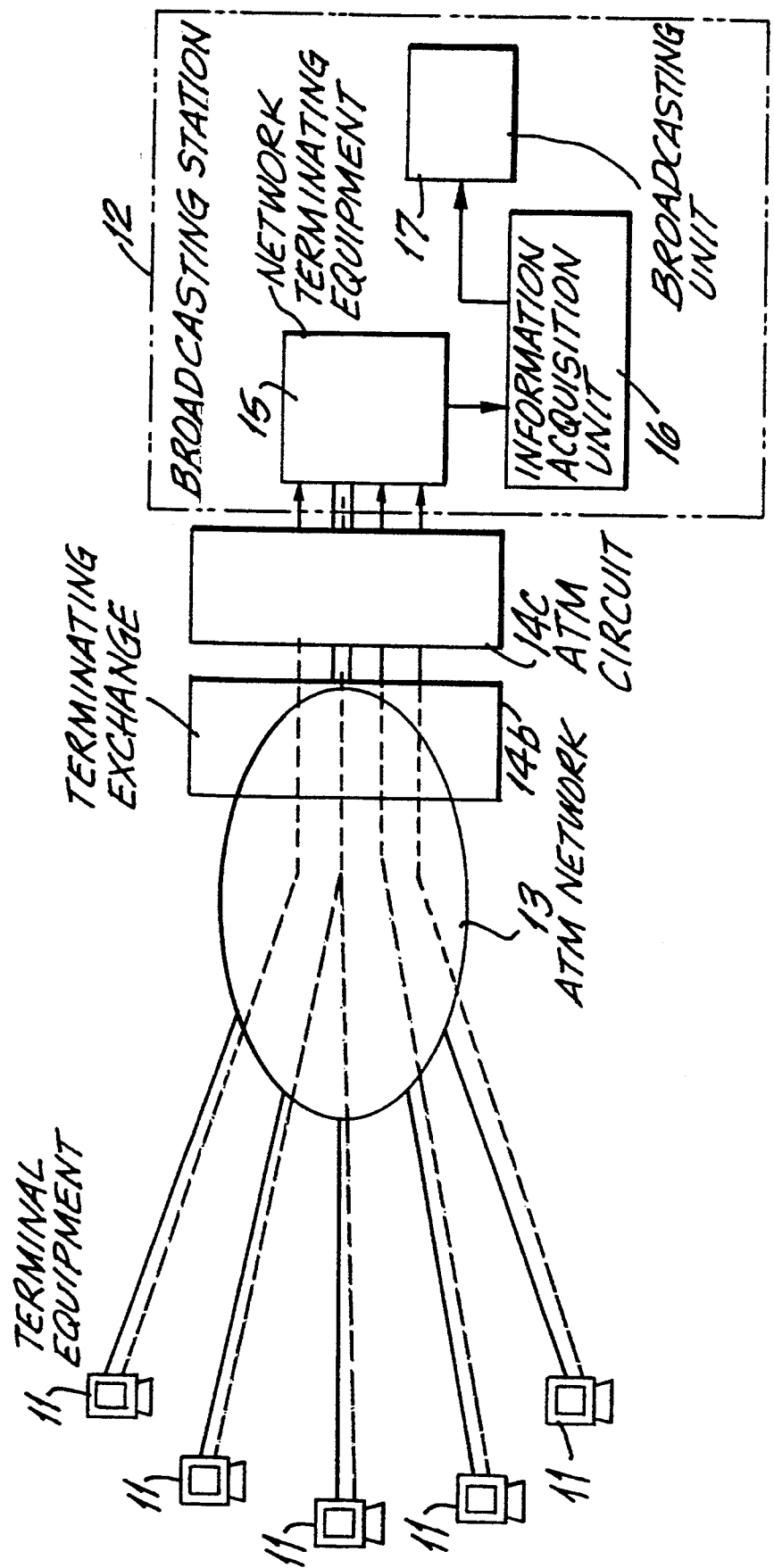
FIG. 7 is a block diagram showing the overall construction of the information acquisition system of the present invention.

FIG. 7 is a block diagram showing the overall construction of the information acquisition system of the present invention. Portions identical with those in FIG. 1 are designated by like reference numerals. The system includes terminal equipment 11, 11, . . . provided on the side of the participants for entering responses to questions from an audience-participation show, the broadcasting station 12 for radio, television or the like, the B-ISDN (ATM network) 13 based on ATM, the ATM exchange 14b, which is provided in the ATM network and is a terminating exchange with regard to the broadcasting station 12, and the single ATM circuit 14c which connects the terminating exchange and the broadcasting station and is capable of high-speed data transmission. The broadcasting station includes the network terminating equipment 15, the information acquisition unit 16 for totalizing response data contained in data cells, and the broadcasting unit 17. The dashed lines in FIG. 7 indicate virtual paths between the participants and the network terminating equipment 15. A multiplicity of virtual paths are established on the one physical line 14c, and the response data from the multiplicity of items of terminal equipment 11, 11, . . . are transmitted to the network terminating equipment 15 in multiplexed fashion.

Terminal Equipment

Figure 8:
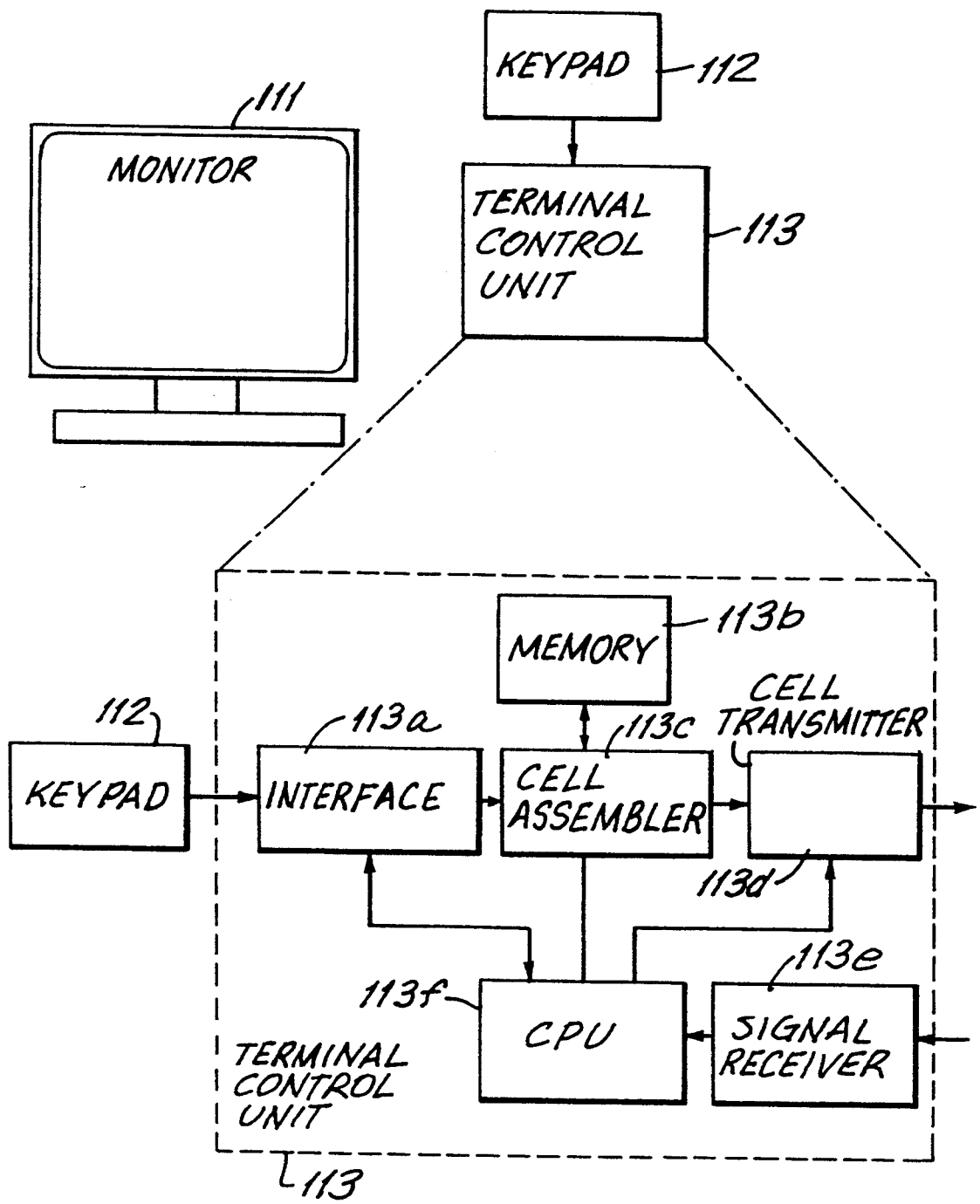
FIG. 8 is a block diagram showing the construction of terminal equipment.

FIG. 8 is a block diagram showing the construction of the terminal equipment. The terminal equipment includes a television (monitor) 111 which receives a television broadcast and outputs a television picture and audio, a keypad 112 having ten numeric keys and such keys as a "#" key and "*" key, and a terminal control unit 113 for producing cells by breaking the data down to blocks of a fixed length and adding a predetermined VCI to each block, and sending the cells to the ATM network. The terminal control unit 113 includes an interface 113a for interfacing the keypad 112, a memory 113b for storing the terminal number (e.g., the telephone number) of the terminal equipment 11 as well as the classification and attributes of the terminal equipment, a cell assembler 113c for forming cells by breaking down data into blocks of fixed length and adding the assigned VCI, a cell transmitting unit 113d for sending the cells formed to the ATM network, a signal receiving unit 113e for receiving and assembling, in cell units, the VCIs and other control signals sent from the ATM network, and a CPU 113f for controlling all of the foregoing components.

When an operation to call the broadcasting station 12 is performed using the keypad 112, the cell assembler 113c, under the control of the CPU 113f, produces signal cells by dividing the data which contains the terminal number (originating number) and broadcasting-station number (terminating number) into cell units and adding special VCIs for calling purposes to respective ones of the divided items of data, and sends the signal cells to the ATM network 13 from the cell transmitting unit 113d. The ATM network 13 performs call control upon receiving a signal cell, decides the VCI of the terminal equipment 11 and notifies the terminal control unit 113. The CPU 113f reads and holds the aforementioned assigned VCI via the signal receiving unit 113f.

When response data subsequently enters from the keypad 112, the assembler 113c, under the control of the CPU 113f, forms data cells by dividing the response data into cell units as the occasion demands and adding the assigned VCI to the divided data, and sends the data cells successively to the ATM network 13 from the cell transmitting unit 113d.

Figures 9A, 9B, 9C:
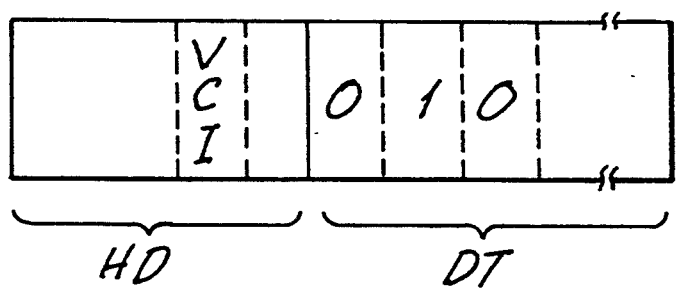

FIG. 9 is a diagram for describing the response data input. Ordinarily, cases in which only a response is inputted are numerous. However, in the example of FIG. 9, a case is illustrated in which the gender and place of residence of a respondent are inputted in addition to "YES" and "NO" response to questions. After a participant has been asked a question by a broadcast program, a method of entering the response to the question, the gender of the participant and the participant's place of residence is displayed on the monitor 111, as shown in FIG. 9(A). In order to enter "YES", "FEMALE" and "TOKYO" the participant operates the keypad 112 to input

```
#1*0
#2*1
#3*0
``` as shown in FIG. 9(B). As a result, the cell assembler 113c creates a data cell shown in FIG. 9(C) and sends the data cell to the ATM network 12.

Overall Operation

When a participant is asked a question by an audience-participation show broadcast on television, for example, the participant uses his/her own terminal equipment 11 to call the broadcasting station. As a result of the call operation, the ATM network 13 performs call control to establish a path between the participant's terminal equipment 11 and the network terminating equipment 15. That is, a logical path is established owing to the fact that the terminal equipment 11 and network terminating equipment 15 mutually possess VCIs.

Thereafter, the participant selects a response ("YES" or "NO", for example) from the available choices and enters this response. As a result, the terminal equipment 11 forms a data cell by adding the already assigned VCI to the inputted response data and then sends this data cell to the ATM network 13. When the data cell reaches the terminating terminal 14b via the path that has been decided, the terminating terminal 14b converts the VCI of this data cell into the VCI of the broadcasting station and then sends the data cell to the network terminating equipment 15 of the broadcasting station 12.

The network terminating equipment 15 in the broadcasting station 12 inputs the data cell to the information acquisition unit 16, which proceeds to collect, analyze and totalize the response data for every VCI added to the inputted data cells. The broadcasting unit 17 is notified of the results of totalization.

Figure 10:
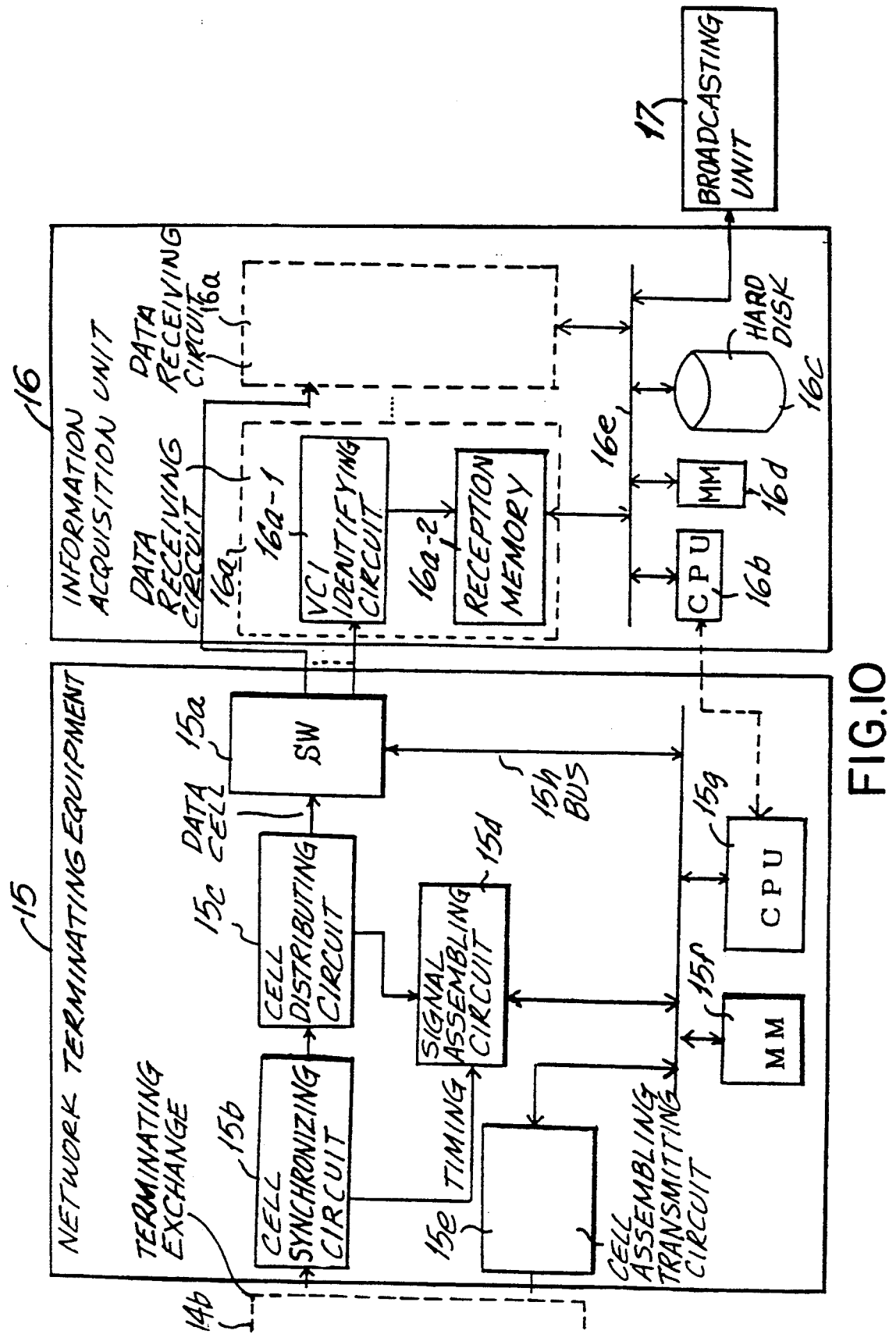
FIG. 10 is a block diagram showing the arrangement of components of a broadcasting station in the information acquisition system of the present invention.

(d) Construction and operation of the broadcasting station in the information acquisition system Internal Arrangement of Broadcasting Station FIG. 10 is a block diagram showing the arrangement of components in the broadcasting station of the information acquisition system according to the present invention. Portions identical with those shown in FIG. 7 are designated by like reference numerals.

Figure 11:
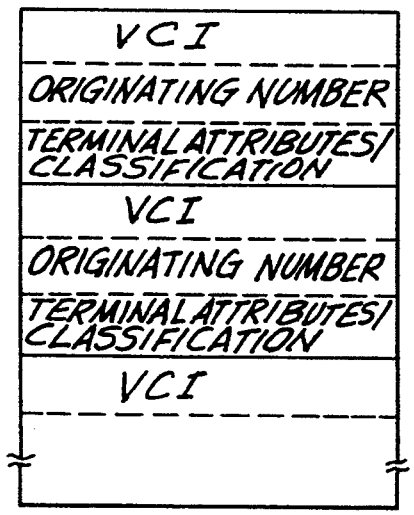
FIG. 11 is a view for describing information contained in a signal cell.

The network terminating equipment 15 includes a switch (SW) 15a and a cell synchronizing circuit 15b for synchronizing the cells delivered from the terminating exchange 14b and generating a timing signal. The cell synchronizing signal 15b performs error correction using the error correction code HEC (see FIG. 2) contained in the header of a cell and, when no error is detected, judges that the cell has been received correctly and outputs a timing signal. The network terminating equipment 15 further includes a cell distributor 15c which identifies an incoming cell as being a signal cell or a data cell and then distributes the cell, a signal assembler 15d which, when an incoming cell is a signal cell, assembles the information contained in the signal cell, an assembling/transmitting circuit 15e for sending an answer cell back to the terminating exchange 14b and sending back a call-disconnect cell after a data cell has been received, a memory 15f for successively storing the terminal number (the originating number) and the terminal attributes/classification in correlation with the VCI contained in the signal cell, as illustrated in FIG. 11, and a central processing unit (CPU) 15g connected via a bus 15h to the switch 15a, signal assembler 15d, cell assembling/transmitting circuit 15e and memory 15f in order to control these components. The CPU 15g is designed so as to be capable of exchanging data with a CPU 16b in the information acquisition unit 16. The arrangement is such that the CPU 15g (1) provides the information acquisition unit 16 with the correlation between the VCIs and the terminal numbers and terminal attributes/classifications, and (2) is informed by the information acquisition unit 16 of the completion of data reception.

The information acquisition unit 16 includes data receiving circuits 16a, 16a, . . . for receiving participant responses from the network terminating equipment 15, the central processing unit (CPU) 16b for acquiring, analyzing and totalizing the results of response reception, a memory device 16c such as a hard disk for storing the results of acquisition and totalization, a main memory (MM) 16d for storing programs necessary for CPU operation, and a bus 16e. Each data receiving circuit 16a includes VCI identifying means 16a-1 which, when a data cell is received, identifies the VCI contained in this data cell, and a reception memory for storing response data, which is contained in the data cell, in correlation with the identified VCI. Though a plurality of the data receiving circuits 16a are provided, one will suffice if it is capable of receiving each cell and executing the necessary processing at high speed.

Figure 12:
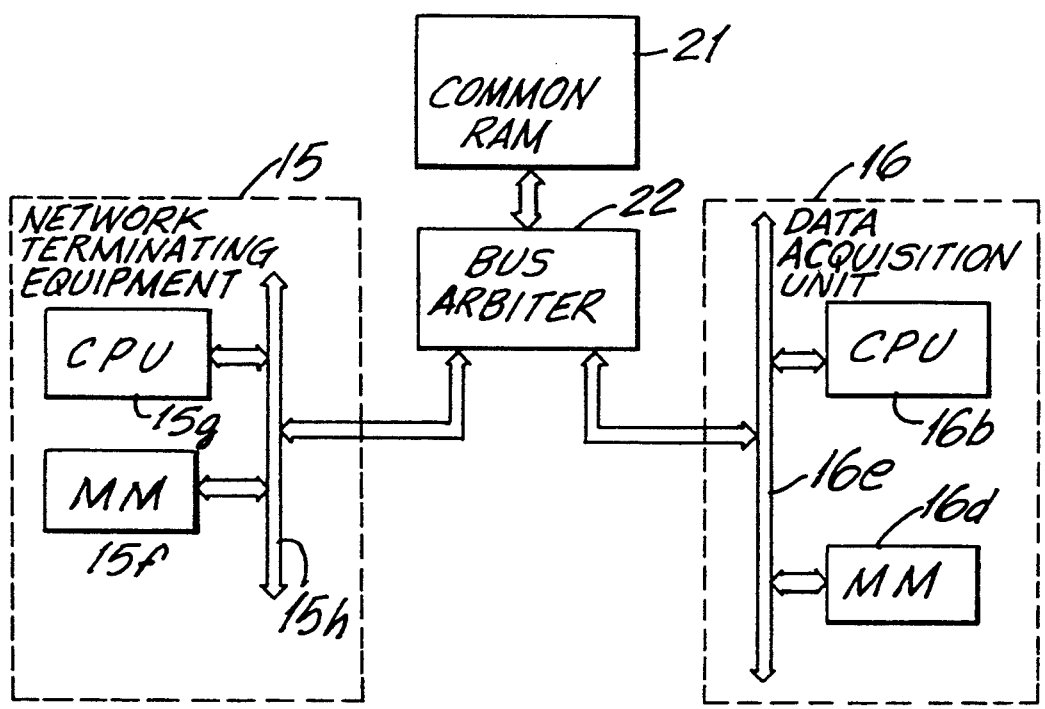
FIG. 12 is a block diagram illustrating an arrangement for data communication between CPUs.

The CPU 15g of the network terminating equipment 15 and the CPU 16b of the information acquisition unit 16 are arranged so as to be capable of exchanging data with each other, as mentioned above. FIG. 12 is block diagram showing an arrangement for the data communication between the two CPUs. Portions identical with those shown in FIG. 10 are designated by like reference numerals. The arrangement of FIG. 12 includes a common RAM 21 and a bus arbiter 22. The bus arbiter 22 connects the buses 15h, 16e of the respective CPUs 15g, 16b to the common RAM 21 based upon requests from the two CPUs. The CPU 15g stores data that is to be communicated in a first storage area of the common RAM 21, and the CPU 16b reads the data from the first storage area so that the data is communicated from the CPU 15g to the CPU 16b. The CPU 16b stores data that is to be communicated in a second storage area of the common RAM 21, and the CPU 15g reads the data from the second storage area so that the data is communicated from the CPU 16b to the CPU 15g. Accordingly, the CPU 15g plants the correlation data between the VCI and originating number, etc., which has been stored in the memory 15f, in the main memory 16d of the information acquisition unit 16 by the above-described communication control. Further, as a result of this communication control, CPU 16b notifies the CPU 15g of the network terminating equipment 15 of the fact that reading of the data cell has ended.

Operation on Broadcasting-Station Side

In response to a call operation from the terminal equipment 11, the ATM network 12 performs call control. When call information arrives at the terminating exchange 14b in call control, the terminating exchange 14b decides the VCI of the broadcasting station (the network terminating equipment), creates a signal cell by adding a special VCI for terminating purposes to information containing an incoming message as well as the originating number and terminal attribute/classification of the broadcasting station, and sends this signal cell to the network terminating equipment 15 of the broadcasting station.

In a case where the incoming cell is a signal cell, the cell distributor 15c of the network terminating equipment 15 distributes the signal signal to the signal assembler 15d, which proceeds to assemble the information that is contained in the cell. If there is an incoming message in the assembled information, the CPU 15g checks to see whether reception is possible and, if reception is possible, instructs the assembling/transmitting circuit 15e to transmit an answer cell. Furthermore, the CPU 15 decides which of the data receiving circuits 16a, 16a, . . . is to be sent the data cell containing the VCI designated by the signal cell, and so informs the switch 15a.

In response to reception of the answer cell, the ATM network 12 assigns a VCI to the participant's terminal equipment 11 and thereafter sends the data cell from the terminal equipment 11 to the terminating exchange 14b.

Since 44-byte data can be placed in one data cell, transmission of one data cell will be adequate for a response which is a simple "YES" or "NO".

Figure 13A:
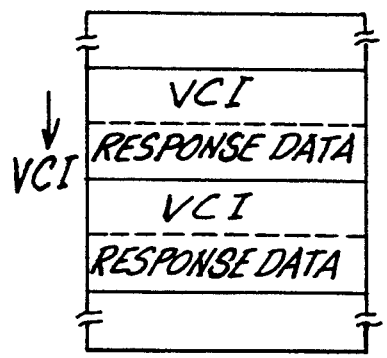
Figure 13B:
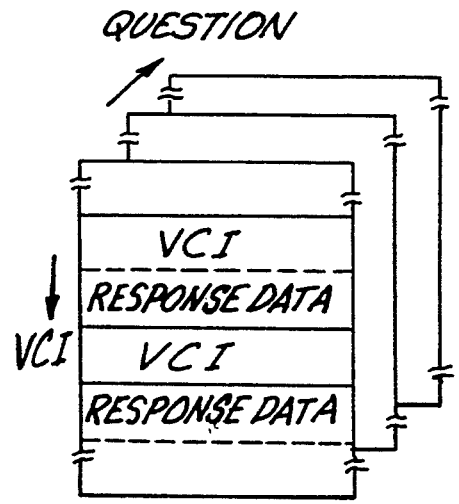
Figure 13C:
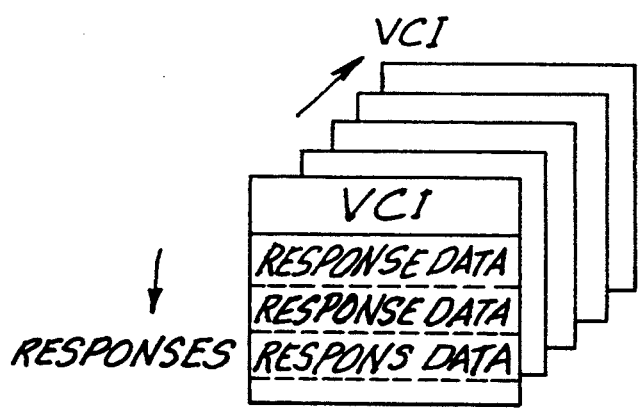
Figure 13D:
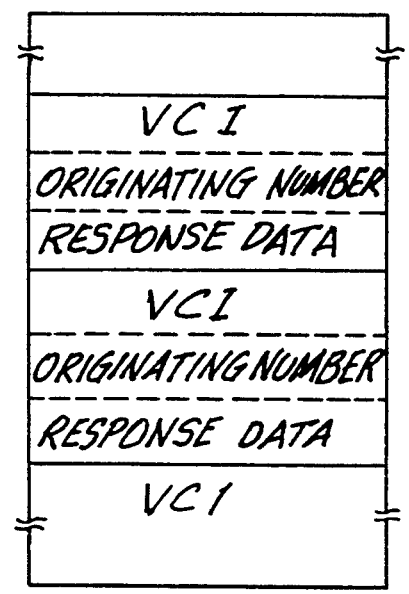

The terminating exchange 14b converts the VCI of the received data cell into the VCI of the broadcasting station and then sends this data cell to the network terminating equipment 15. If the incoming cell is a data cell, the cell distributor 15c of the network terminating equipment 15 inputs this data cell to a predetermined data receiving circuit 16a via the switch 15a. The VCI identifying circuit 16a-1 of the data receiving circuit identifies the VCI in the inputted data cell and stores it in the reception memory 16a-2 every VCI. FIG. 13 shows examples of data stored in the reception memory 16a-2, in which FIG. 13(A) is an example in which response data is stored in simple fashion every VCI, FIG. 13(B) is an example in which, when responses are received in reply to respective ones of a plurality of questions, the response data is stored every VCI upon being classified according to question, and FIG. 13 (C) is an example in which, when responses are received in reply to respective ones of a plurality of questions, the response data is stored in storage areas that differ every VCI.

When reception of a data by the data receiving circuits 16a has been completed, the CPU 16b of the information acquisition unit 16 so informs the CPU 15g and collects the response data from each of the reception memories 16a-2. The CPU 16b then correlates the collected response data with the data (the data indicative of the correspondence between the VCIs and originating numbers) that has already been sent from the network terminating equipment 15, and stores the original numbers and response data, etc., in the hard disk 16c or memory 16d in correlation with the VCIs [see FIG. 13(D)]. In addition, the CPU 16b uses this data to analyze the responses, totalize the number of responses, the number of "YES" responses and the number of "NO" responses, and inform the broadcasting unit 17 of the intermediate results of totalization and the final results of totalization as appropriate.

It should be noted that the location at which the terminal equipment has been installed, namely the place of residence of the participant, also can be determined from the originating number. In a case where the response data includes the gender and place of residence of the participant, these items of data can be used to perform totalization by gender and totalization by region.

By being notified of the completion of reception of the data cell, the CPU 15g of the network terminating equipment 15 instructs the cell assembling/transmitting circuit 15e to disconnect the call having a predetermined VCI. As a result, the cell assembling/transmitting circuit 15e creates a call-disconnect cell for disconnecting the call of the designated VCI and sends this call-disconnect cell to the terminating exchange 14b. This operation ends the communication associated with one call.

(e) Overall communication sequence

Figure 14:
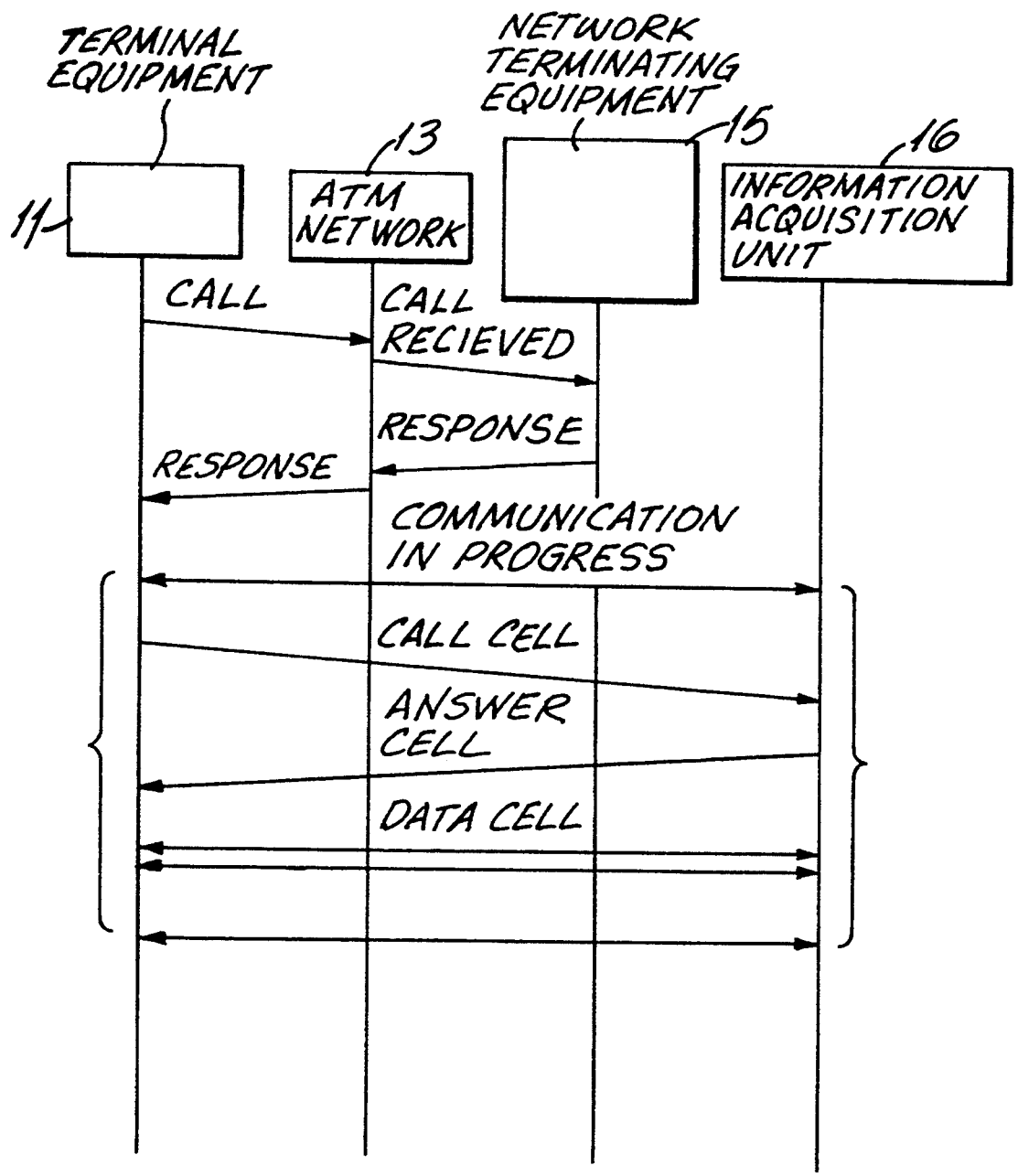
FIG. 14 is a diagram for describing a communication sequence according to the present invention.

FIG. 14 illustrates the overall communication sequence according to the information broadcasting station 12, the network terminating equipment 15 of the broadcasting station receives the call and sends back an answer via the ATM network 13. In response to receiving the answer, the terminal equipment 11 is placed in a state of data communication with the information acquisition unit 16 of the broadcasting station (that is, a link is established with the unit 6 as described earlier). Next, the terminal equipment 11 transmits the call cell, in response to which the information acquisition unit 16 sends back the answer cell, whereby both sides mutually verify the data sending and receiving procedure. Thereafter, the terminal equipment 11 and information acquisition unit 16 respectively send and receive the data cell.

Figure 15:
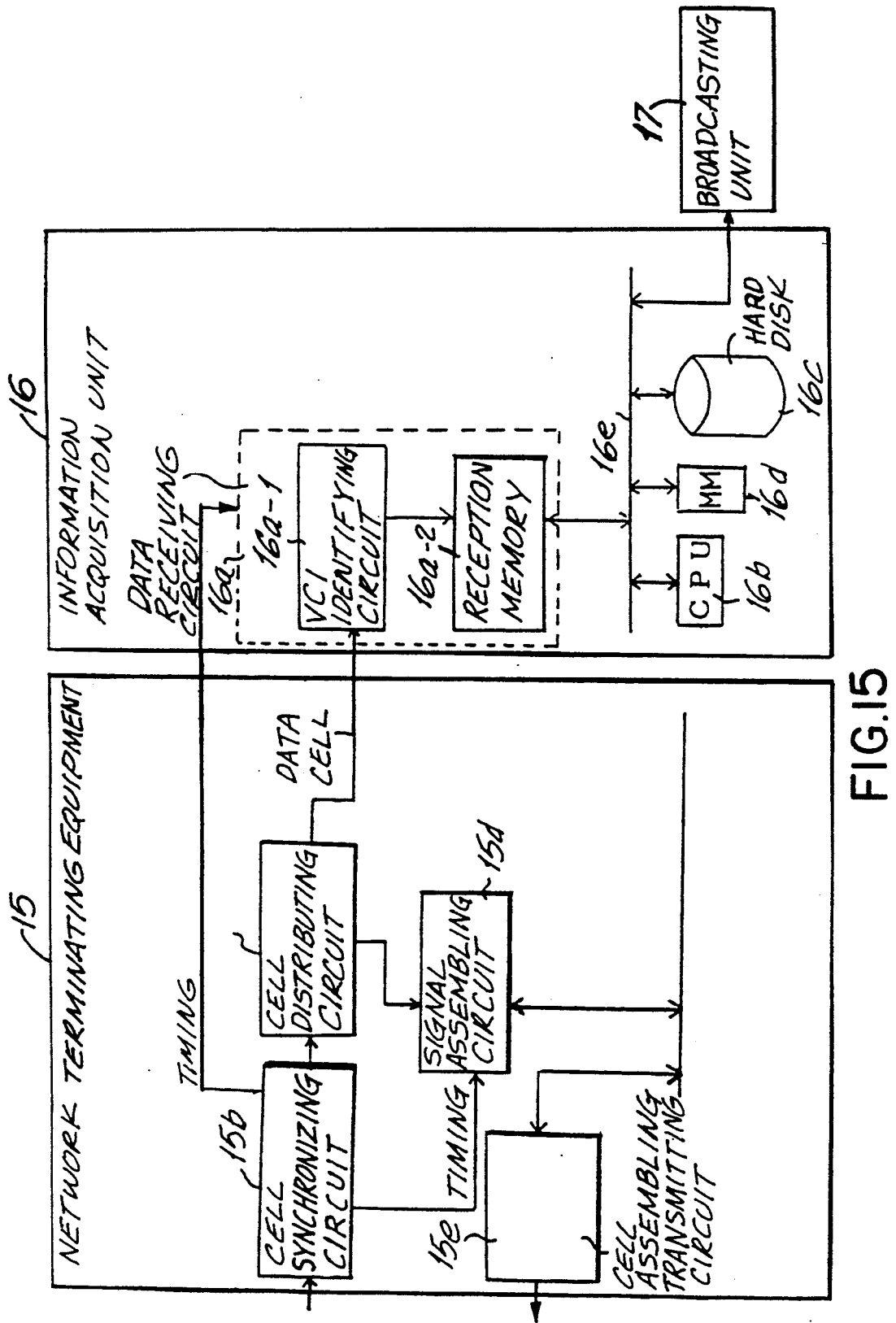
FIG. 15 is a block diagram showing another arrangement of the components of a broadcasting station in the information acquisition system of the present invention.
Figure 16:
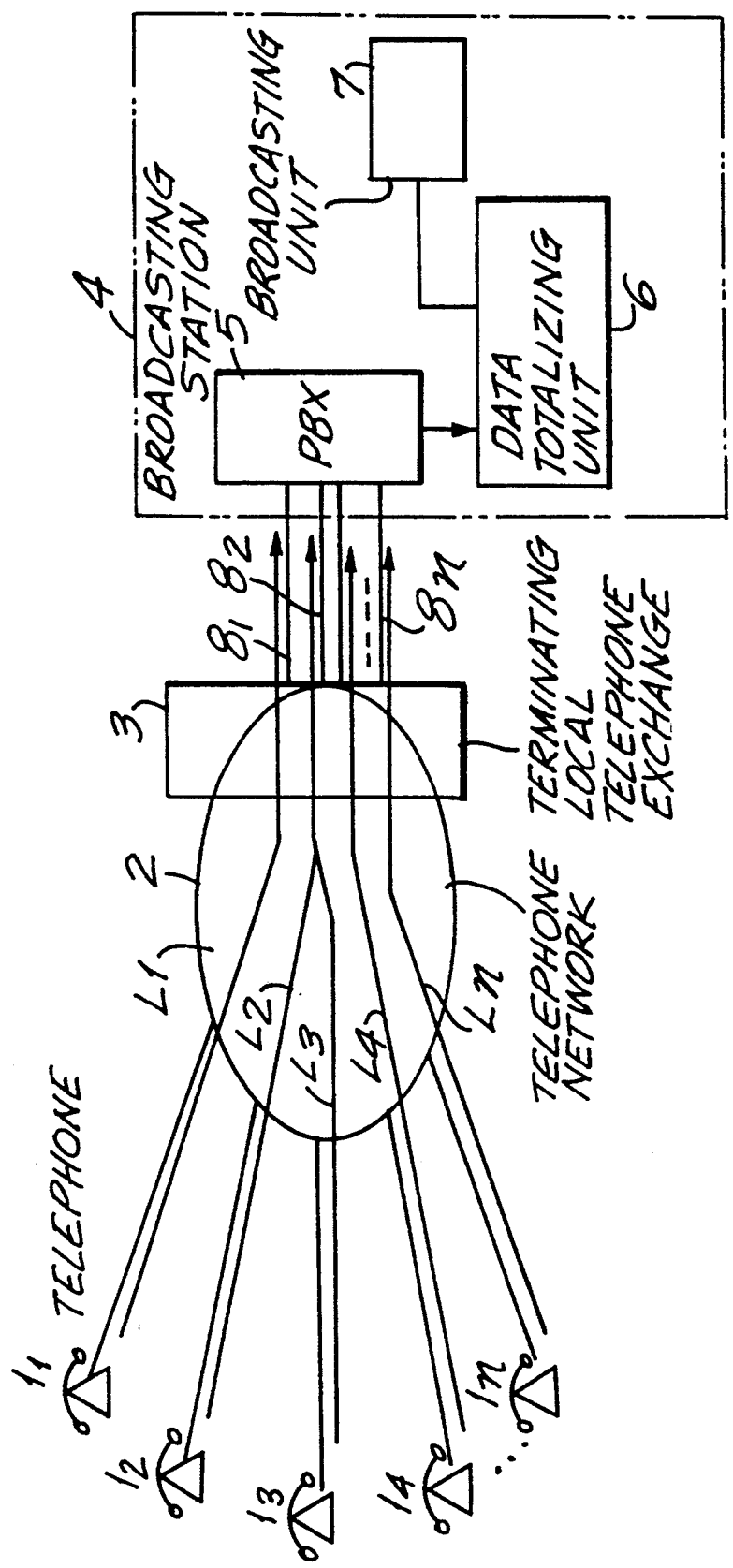
FIG. 16 is a block diagram showing the overall construction of an information acquisition system of the prior art.
Figure 17:
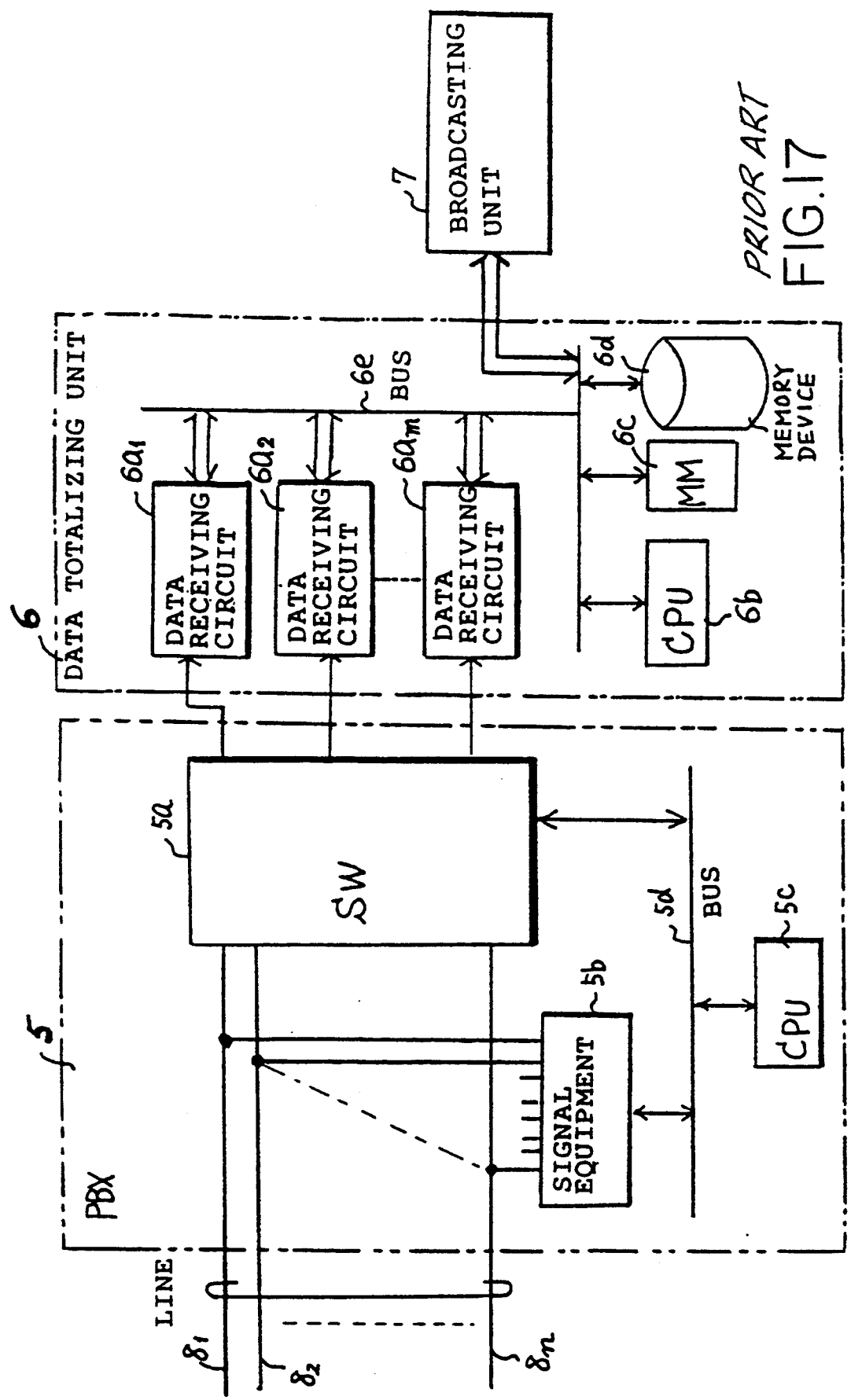
FIG. 17 is a block diagram showing a specific example of the arrangement of components in a broadcasting station in the information acquisition system of the prior art.
Figure 18:
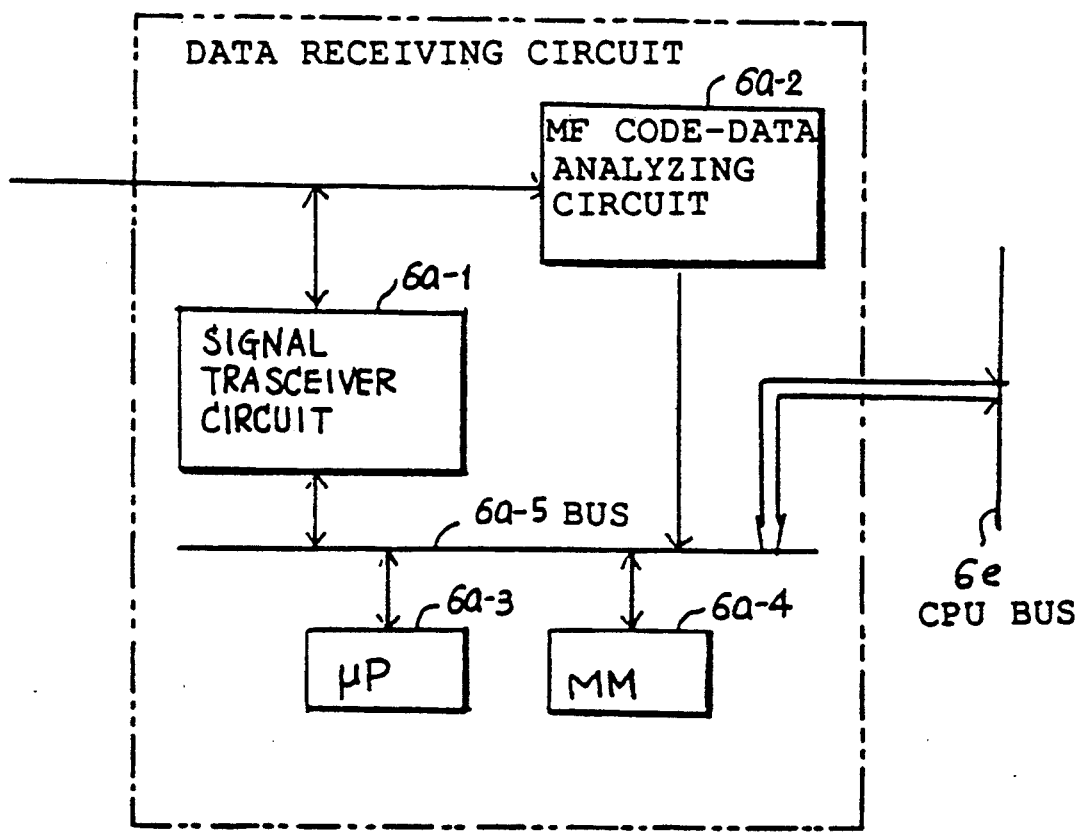
FIG. 18 is a block diagram showing the construction of a data receiving circuit according to the prior art.

(f) Other internal arrangement of the broadcasting station in the information acquisition system FIG. 15 is a block diagram showing another arrangement of components in the broadcasting station of the information acquisition system according to the present invention. Portions identical with those shown in FIG. 10 are designated by like reference numerals. In a case where the data receiving circuit 16a is capable of performing processing at a high speed in comparison with the cell arrival period, it is unnecessary to provide a plurality of data receiving circuits; only one will suffice. In such case, the network terminating equipment 15 need not be provided with a switch, and the function of the CPU in the network terminating equipment can be taken over by the CPU 16b. FIG. 15 represents an embodiment in which only a single data receiving circuit 16a is provided, and in this respect it differs from the embodiment of FIG. 10. Other features which distinguish this embodiment over that of FIG. 10 are (1) the switch in the network terminating equipment 15 is dispensed with, and (2) the function of the CPU in the network termination equipment 15 is incorporated in the CPU 16b of the information acquisition unit 16.

In accordance with the information acquisition system of the present invention, the terminal equipment and the broadcasting station are interconnected by an ultra-high-speed ATM network, and therefore a multiplicity of logical links are established on a single physical line so that response data from a large number of participants can be transmitted in multiplexed fashion. As a result, it can be so arranged that busy lines and other such phenomena will not occur even if there are few lines between the broadcasting station and the terminating exchange, and even if the number of participants in a program is increased. Moreover, the occurrence of terminating congestion in the terminating exchange can be eliminated.

Further, in accordance with the information acquisition system of the present invention, the arrangement is such that the originating number of the terminal equipment and the attributes of the terminal equipment are transferred automatically at every call prior to transfer of the response data. Moreover, the response data is transferred upon first attaching a VCI for call identification. As a result, response analysis that takes the attributes of the respondent into consideration can be performed on the side of the broadcasting station merely by inputting the response data from the terminal equipment.

Further, in accordance with the information acquisition system of the invention, the terminal equipment and the broadcasting station are connected by the ultra-high-speed ATM network. As a result, even if response data in answer to a plurality of questions as well as attribute data relating to the gender and places of residence, etc., of the respondents is entered, this data can be transmitted in a short period of time without the occurrence of phenomena such as busy lines and terminating congestion. This makes possible multiple questioning by a television or radio program as well as response analysis that takes the gender and places of residence of the respondents into consideration.

As many apparently widely different embodiments of the present invention can be made without departing from the spirit and scope thereof, it is to be understood that the invention is not limited to the specific embodiments thereof except as defined in the appended claims.

What is claimed is:

1. An information acquisition system for acquiring information which includes responses to questions which participants have been asked by broadcast program, comprising:

a plurality of terminal equipment for inputting responses from unspecified audiences of a predetermined broadcast program;

an ATM (Asynchronous Transfer Mode) network connected to said plurality of terminal equipment and receiving information including responses from unspecified audiences of said broadcast program and transmitting said information to a broadcasting station, said information including a response inputted from a predetermined terminal equipment of a participant of said broadcast program;

network terminating equipment provided in the broadcasting station and connected to a predetermined ATM exchange in said ATM network; and an information acquisition unit, which is connected to said network terminating equipment, for receiving and collecting, via said ATM network and said network terminating equipment, information from unspecified audiences of said broadcast program, said information including the response inputted from said predetermined terminal equipment, wherein when said predetermined terminal equipment calls the broadcasting station, said ATM network performs call control to decide a path between said terminal equipment and the broadcasting station and designates different virtual channel identifiers for said terminal equipment and said broadcasting station, said terminal equipment produces a data cell by adding the virtual channel identifier designated by said ATM network to the information which includes the response to the question, and sends the data cell produced to said ATM network, said ATM network sends the data cell via said path to the ATM exchange to which the network termination equipment of the broadcasting station has been connected, and said ATM exchange replaces the virtual channel identifier that has been added to the data cell by the virtual channel identifier that has been designated for said broadcasting station, and sends this data cell to said network terminating equipment; and wherein, when a call is made at said predetermined terminal equipment, said terminal equipment produces a signal cell by adding a special virtual channel identifier determined for a call to information which includes an originating number and a terminating number, and sends said signal cell to said ATM network, said ATM network performs the call control in response to reception of the signal cell and, prior to sending of a data cell, said ATM exchange as a terminating exchange produces a signal cell by adding a special virtual channel identifier determined for termination to information which includes a virtual channel identifier, designated for the broadcasting station, as well as the originating number, and sends said signal cell to the network terminating equipment of the broadcasting station, and said network terminating equipment receives said signal cell and stores the correspondence between the virtual channel identifier and the originating number; and wherein said network terminating equipment includes:

a cell distributor for identifying an incoming cell from said ATM network as being a data cell or a signal cell, distributing the data cell to said information acquisition unit and distributing the signal cell to a signal assembling circuit, which is a subsequent stage;

the signal assembling circuit which, when the incoming cell is a signal cell, is for assembling information contained in said signal cell;

a call controller which, in a case where said information contains an incoming message, sends an answer cell back to the terminating exchange and, upon reception of the data cell, sends back a call-disconnect cell; and means for preserving the correspondence between the virtual channel identifier and the originating number contained in the assembled information.

2. The information acquisition system according to claim 1, wherein said information acquisition unit comprises:

identifying means which, when the data cell is received, is for identifying the virtual channel identifier contained in said data cell;

memory means for storing response data, which is contained in said data cell, in correlation with the virtual channel identifier; and totalizing means for analyzing and totalizing the response data stored in said memory means.

3. The information acquisition system according to claim 2, wherein said information acquisition unit correlates and stores the originating number and the response data by using a correlation between the virtual channel identifier and the originating number as well as a correlation between the virtual channel identifier and the response data.

4. The information acquisition system according to claim 2, wherein when the response data contains gender or place of residence, said information acquisition unit analyzes and totalizes responses by gender or by place of residence.

5. An information acquisition system for acquiring information which includes responses to questions from unspecified audiences which have been asked by broadcast program, comprising:

an information acquisition unit for receiving and collecting information which includes the responses from unspecified audiences of a predetermined broadcasting program, said information acquisition unit being connected to a network terminal equipment which transmits a response to said information acquisition unit as a data cell, wherein said information acquisition unit comprises:

identifying means which, when an incoming data cell is received from said network terminal equipment, is for identifying a virtual channel identifier contained in said data cell;

memory means for storing response data, which is contained in said data cell, in correlation with the virtual channel identifier; and totalizing means for analyzing and totalizing the response data stored in said memory means.

6. The information acquisition system according to claim 5, wherein said information acquisition unit correlates and stores an originating number and the response data by using a correlation between the virtual channel identifier and the originating number as well as a correlation between the virtual channel identifier and the response data.

7. The information acquisition system according to claim 5, wherein when the response data contains gender or place of residence, said information acquisition unit analyzes and totalizes responses by gender or by place of residence.

8. An information acquisition system for acquiring information including responses to questions from any participants of a broadcast program, comprising:

terminal means for transmitting a response from a participant of the broadcast program;

information acquiring means; and

ATM (Asynchronous Transfer Mode) network means for establishing a communication channel between said terminal means and said information acquiring means and for transmitting the response to said information acquiring means;

said information acquiring means including identifying means which, when a data cell is received therein, identifies a virtual channel identifier contained in said data cell;

memory means for storing response data from said participant, which is contained in said data cell, in correlation with the virtual channel identifier; and totalizing means for analyzing and totalizing the response data stored in said memory means.

9. The information acquisition system according to claim 8, and further comprising a network terminating equipment provided in a broadcast station and connected to said ATM network means, wherein said network terminating equipment includes:

a cell distributor for identifying an incoming cell from said ATM network as being a data cell or a signal cell, distributing the data cell to said information acquiring means and distributing the signal cell to a signal assembling circuit, which is a subsequent stage;

the signal assembling circuit which, when the incoming cell is a signal cell, is for assembling information contained in said signal cell;

a call controller which, in a case where said information contains an incoming message, sends an answer call back to the ATM network means and, upon reception of the data cell, sends back a call-disconnect cell; and means for preserving the correspondence between the virtual channel identifier and the originating number contained in the assembled information.

10. The information acquisition system according to claim 8, wherein when a call is made, said terminal means produces a signal cell by adding a special virtual channel identifier determined for a call to information which includes an originating number and a terminating number, and sends said signal cell to said ATM network means;

said ATM network means performs a call control in response to reception of the signal cell and, prior to sending of the data cell, produces a signal cell by adding a special virtual channel identifier determined for termination to information which includes said virtual channel identifier, designated for a broadcasting station, as well as the originating number, and sends said signal cell to the broadcasting station; and the broadcasting station receives said signal cell and stores the correspondence between the virtual channel identifier and the originating number.

* * * * *